(12) United States Patent
Ren et al.

(10) Patent No.: US 10,772,133 B2
(45) Date of Patent: Sep. 8, 2020

(54) METHOD AND DEVICE FOR DETERMINING PREAMBLE SEQUENCE OF PHYSICAL RANDOM ACCESS CHANNEL

(71) Applicant: CHINA ACADEMY OF TELECOMMUNICATIONS TECHNOLOGY, Beijing (CN)

(72) Inventors: Bin Ren, Beijing (CN); Ren Da, Beijing (CN); Fang-Chen Cheng, Beijing (CN); Ekpenyong Tony, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/496,947

(22) PCT Filed: Feb. 22, 2018

(86) PCT No.: PCT/CN2018/076981
§ 371 (c)(1),
(2) Date: Sep. 23, 2019

(87) PCT Pub. No.: WO2018/171373
PCT Pub. Date: Sep. 27, 2018

(65) Prior Publication Data
US 2020/0120712 A1    Apr. 16, 2020

(30) Foreign Application Priority Data
Mar. 22, 2017  (CN) .......................... 2017 1 0175422

(51) Int. Cl.
*H04W 74/08*   (2009.01)
*H04J 13/00*   (2011.01)
(Continued)

(52) U.S. Cl.
CPC ..... *H04W 74/0833* (2013.01); *H04J 13/0062* (2013.01); *H04L 5/0048* (2013.01);
(Continued)

(58) Field of Classification Search
CPC ............ H04W 74/0833; H04W 74/002; H04L 5/0053; H04L 27/2607; H04J 13/0062
See application file for complete search history.

(56) References Cited

U.S. PATENT DOCUMENTS

| 7,876,858 B1 | 1/2011 | Lee et al. |
| 2009/0191875 A1* | 7/2009 | Vujcic ................. H04W 74/004 455/436 |

(Continued)

FOREIGN PATENT DOCUMENTS

| CN | 101594168 A | 12/2009 |
| CN | 101601221 A | 12/2009 |

(Continued)

OTHER PUBLICATIONS

CATT: "On NR RACH Preamble Design", 3GPP TSG RAN WG1 Meeting #88bis, R1-1704540, Spokane, USA; Apr. 3, 2017-Apr. 7, 2017.

*Primary Examiner* — Mohammad S Anwar
(74) *Attorney, Agent, or Firm* — Kilpatrick Townsend & Stockton, LLP

(57) ABSTRACT

Disclosed are a method and device for determining a preamble sequence of a physical random access channel. The method includes in a previous stage, receiving respective preamble sub-sequences, and determining instances of time at which the respective preamble sub-sequences are detected in a detection window; in a current stage, receiving respective preamble sub-sequences, and determining instances of time at which the respective preamble sub-sequences are detected in the detection window; and determining preamble sub-sequences belonging to a same preamble sequence (Continued)

according to the instances of time at which the respective preamble sub-sequences are detected in the current stage, and the instances of time at which the respective preamble sub-sequences are detected in the previous stage.

15 Claims, 3 Drawing Sheets

(51) Int. Cl.
*H04L 5/00* (2006.01)
*H04L 27/26* (2006.01)
*H04W 74/00* (2009.01)

(52) U.S. Cl.
CPC ........ *H04L 5/0053* (2013.01); *H04L 27/2607* (2013.01); *H04W 74/002* (2013.01)

(56) References Cited

U.S. PATENT DOCUMENTS

| | | | |
|---|---|---|---|
| 2010/0020905 A1* | 1/2010 | Mansour | H04J 11/00 375/343 |
| 2010/0135493 A1 | 6/2010 | Yoon et al. | |
| 2010/0278137 A1 | 11/2010 | Kwon et al. | |
| 2013/0208679 A1 | 8/2013 | Joung et al. | |
| 2014/0018082 A1* | 1/2014 | Cheng | H04W 36/0005 455/444 |
| 2015/0365977 A1 | 12/2015 | Tabet et al. | |

FOREIGN PATENT DOCUMENTS

| | | |
|---|---|---|
| CN | 102447532 A | 5/2012 |
| CN | 103841072 A | 6/2014 |
| CN | 106464627 A | 2/2017 |

\* cited by examiner

METHOD AND DEVICE FOR DETERMINING PREAMBLE SEQUENCE OF PHYSICAL RANDOM ACCESS CHANNEL

This application is a National Stage of International Application No. PCT/CN2018/076981, filed Feb. 22, 2018, which claims the benefit of priority to Chinese Patent Application No. 201710175422.6, filed with the Chinese Patent Office on Mar. 22, 2017, which is hereby incorporated by reference in its entirety.

FIELD

The present application relates to the field of wireless communications, and particularly to a method and device for determining a preamble sequence on a physical random access channel.

BACKGROUND

In the study on a preamble sequence on a New Radio (NR) Physical Random Access Channel (PRACH) in a $5^{th}$-Generation (5G) mobile communication system, in order to further improve the performance of detecting a preamble, and to lower the probability that short preamble sequences collide with each other, a multi-stage (M-stage) preamble sequence has been designed, where an M-stage preamble sequence including M number of preamble sub-sequences is used for Msg1 transmission in a random access. A User Equipment (UE) selects an M-stage preamble sequence from a predefined or network-configured set of M-stage preamble sequences, and transmits it over a network-configured time-frequency resource. The network (a next-Generation Node B (gNB) or a Transmission and Reception Point (TRP)) detects the time-frequency resource respectively for M preamble sub-sequences in the M-stage preamble sequence. The M-stage preamble sequence can be detected correctly only if all of the M preamble sub-sequences are detected correctly.

FIG. 1 is a schematic diagram of an example of a designed M-stage preamble sequence on an NR-PRACH, where M=2, that is, a 2-stage preamble sequence includes two preamble sub-sequences (Preamble-1 and Preamble-2 as illustrated). There are respective Cyclic Prefixes (CPs) of two consecutive preamble sub-sequences (Preamble-1 and Preamble-2), and a Guard Time (GT) interval is reserved at the tail of the 2-stage preamble sequence. The respective preamble sub-sequences are selected separately by the UE to compose the 2-stage preamble sequence, transmitted as Msg1, and detected respectively at the network side. The 2-stage preamble sequence can be detected correctly only if both of the preamble sub-sequences are detected correctly.

For a root sequence on a PRACH, the root sequence is a Zadoff-Chu (ZC) sequence (simply a ZC root sequence), and since 64 preamble sequences of each cell are generated by cyclically shifting (Ncs, i.e., zero-correlation configuration) the ZC root sequence, and the preamble sequence of the UE is selected randomly, or allocated by the gNB, in order to alleviate the preamble sequences of the adjacent cells from interfering with each other, the indexes of ZC root sequences shall be planned correctly. The indexes of the ZC root sequences are planned by allocating them so that different preamble sequences are generated for the adjacent cells using the indexes to thereby avoid the adjacent cell with the same preamble sequence from interfering with each other.

A Zadoff-Chu (ZC) sequence with a root index $u^{th}$ is defined in Equation (1) of:

$$x_u(n) = e^{-j\frac{\pi u n(n+1)}{N_{ZC}}}, 0 \le n \le N_{ZC} - 1, \qquad (1)$$

Where $N_{ZC}$ represents the length of the ZC sequence, u represents the root index of the ZC sequence, j=sqrt(−1), and n represents the index of a sequence element. A random access preamble is obtained by cyclically shifting the ZC sequence with the root index $u^{th}$ in Equation (2) of:

$$X_{u,v}(n) = x_u((n+C_v) \bmod N_{ZC}), \qquad (2)$$

Where $C_v$ represents a cyclic shift, $C_v = vN_{cs}$, and v represents the V-th cyclic shift Ncs in the range of 0,1, ..., $\lfloor N_{ZC}/N_{CS} \rfloor$, where $\lfloor . \rfloor$ represents rounding off.

A drawback in the prior art lies in that if a plurality of UEs transmits over the same time-frequency resource, then a preamble sequence may not be detected accurately in the existing M-stage preamble sequence solution.

SUMMARY

Embodiments of the application provide a method and device for determining a preamble sequence on a physical random access channel so as to address the problem in the prior art that an M-stage preamble sequence on an NR PRACH may not be detected accurately among a plurality of UEs.

In a first aspect, embodiments of the application provide a method for determining a preamble sequence on a PRACH, the method including:

in a previous stage, receiving respective preamble sub-sequences, and determining instances of time at which the respective preamble sub-sequences are detected in a detection window;

in a current stage, receiving respective preamble sub-sequences, and determining instances of time at which the respective preamble sub-sequences are detected in the detection window; and determining preamble sub-sequences belonging to a same preamble sequence according to the instances of time at which the respective preamble sub-sequences are detected in the current stage, and the instances of time at which the respective preamble sub-sequences are detected in the previous stage.

Optionally the detection window is a ZC sequence detection window.

Optionally the ZC sequence detection window is a ZC sequence detection window of a same root sequence, or a ZC sequence detection window of different root sequences.

Optionally the instances of time at which the respective preamble sub-sequences are detected in the detection window are detected at timing positions.

Optionally determining preamble sub-sequences belonging to the same preamble sequence according to the instances of time at which the respective preamble sub-sequences are detected in the current stage, and the instances of time at which the respective preamble sub-sequences are detected in the previous stage includes:

determining an instance of time at which a preamble sub-sequence is detected in the current stage, and an instance of time at which some preamble sub-sequence as preamble sub-sequences belonging to the same preamble sequence in response to that a difference between the instance of time at which the preamble sub-sequence is detected in the current stage, and the instance of time at which the some preamble sub-sequence is detected in the previous stage is below a preset difference threshold.

In a second aspect, an embodiment of the application provides a device for determining a preamble sequence on a PRACH, the device including:

a processor configured to read and execute program in a memory to: determine instances of time at which respective preamble sub-sequences are detected in a detection window; and determine preamble sub-sequences belonging to a same preamble sequence according to the instances of time at which the respective preamble sub-sequences are detected in a current stage, and the instances of time at which the respective preamble sub-sequences are detected in a previous stage; and a transceiver configured to transmit and receive data under the control of the processor is configured to:

receive the respective preamble sub-sequences in the previous stage; and receive the respective preamble sub-sequences in the current stage.

Optionally the processor is further configured to determine the instances of time at which the respective preamble sub-sequences are detected in a ZC sequence detection window.

Optionally the ZC sequence detection window is a ZC sequence detection window of a same root sequence, or a ZC sequence detection window of different root sequences.

Optionally the processor is further configured to detect the instances of time at which the respective preamble sub-sequences in the detection window at timing positions.

Optionally the processor is further configured to determine an instance of time at which a preamble sub-sequence is detected in the current stage, and an instance of time at which some preamble sub-sequence as preamble sub-sequences belonging to the same preamble sequence in response to that a difference between the instance of time at which the preamble sub-sequence is detected in the current stage, and the instance of time at which the some preamble sub-sequence detected in the previous stage is below a preset difference threshold.

In a third aspect, embodiments of the application provide a readable storage medium of a device for caching synchronization anomaly, comprising program codes configured to cause a computing device to perform the method according to any one of claims 1 to 5, upon being executed on the computing device. Advantageous effects of the application are as follows:

In the technical solutions according to the embodiments of the application, since there is a relationship between the instances of time at which preamble sub-sequences belonging to the same preamble sequence are received, whether respective detected preamble sub-sequences belong to the same preamble sequence can be determined according to the relationship between their instances of time, that is, when a relative timing difference between preamble sub-sequences of a plurality of UEs received by the network is more than an estimated relative timing difference between preamble sub-sequences of some UE, whether they belong to the same preamble sequence can be determined to thereby avoid the problem in the prior art that if a plurality of UEs transmits over the same time-frequency resource, then an M-stage on an NR PRACH preamble sequence may not be detected accurately, and the reliability of the preamble sequence solution can be guaranteed in effect.

BRIEF DESCRIPTION OF THE DRAWINGS

The drawings described here are intended to provide further understanding of the application, and constitute a part of the specification, and the exemplary embodiments of the application, and the description thereof are intended to set forth the application, but not to limit the application unduly.

DETAILED DESCRIPTION OF THE EMBODIMENTS

A drawback in the prior art lies in that if a plurality of UEs transmits over the same time-frequency resource, then a preamble sequence may not be detected accurately in the existing M-stage preamble sequence solution. This will be described below taking M=2 as an example.

For example, two UEs in a system transmit 2-stage preamble sequences over the same time-frequency resource. The UE 1 selects a 2-stage preamble sequence (a, b), where a and b are preamble sub-sequences in the first stage (stage-one) and in the second stage (stage-two), respectively; and the UE 2 selects a 2-stage preamble sequence (c, d), where c and d are preamble sub-sequences in the stage-one and in the stage-two, respectively. A network detects the preamble sub-sequences a and c in two stage-one, and the preamble sub-sequences b and d in two stage-2. At this time, four possible 2-stage preamble sequences, i.e., (a, b), (a, d), (c, b), and (c, d), are generated. The network cannot correctly determine the 2-stage preamble sequences really transmitted by the UE1 and the UE2 at this time, so the 2-stage preamble sequences of the UEs may not be detected accurately.

In view of this, the technical solutions according to the embodiments of the application are intended to address the problem in the prior art that an M-stage (Multi-stage) preamble sequence of an NR PRACH may not be detected accurately among a plurality of UEs. In these solutions, a combination of M-stage preamble sequences is determined based upon estimated elative timing positions of all the M-stage preamble sub-sequences to thereby avoid the problem that if a plurality of UEs transmits over the same time-frequency resource, then an M-stage preamble sequence may not be detected accurately. Particular implementations of the application will be described below with reference to the drawings.

Figure 1:
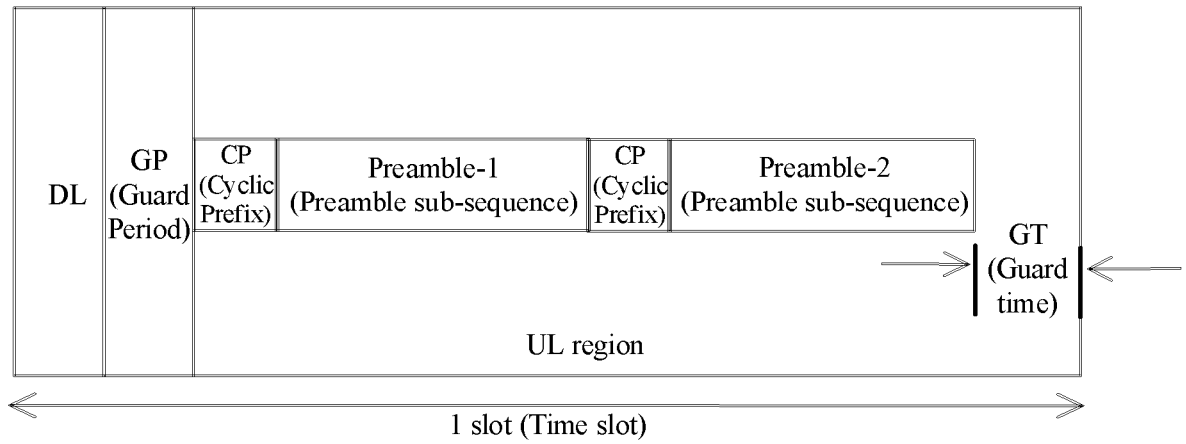
FIG. 1 is a schematic diagram of an example of the designed M-stage preamble sequence on an NR-PRACH in the prior art, where M=2.
Figure 2:
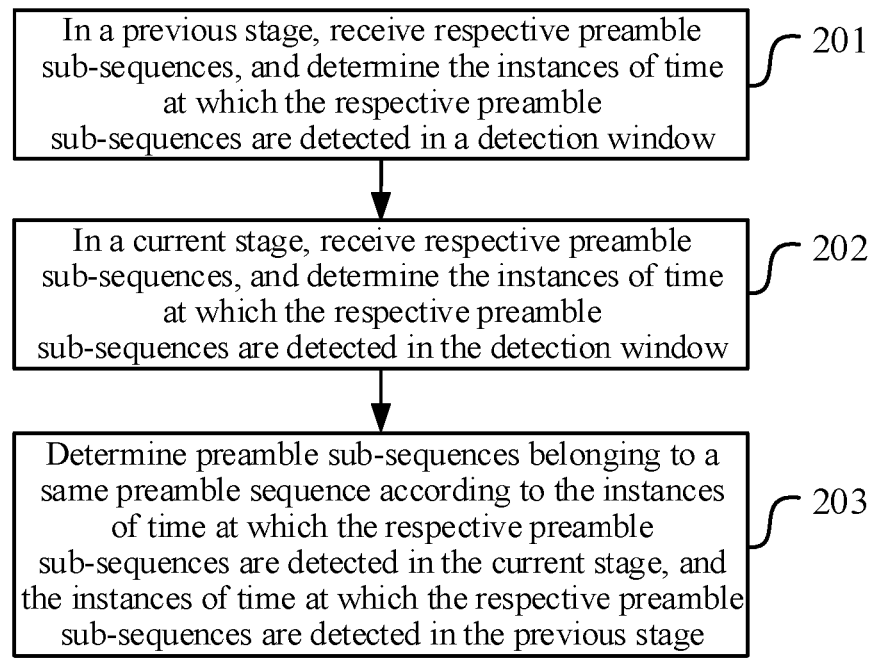
FIG. 2 is a schematic flow chart of a method for determining a preamble sequence on a PRACH according to some embodiments of the application.

FIG. 2 is a schematic flow chart of a method for determining a preamble sequence on a PRACH, and as illustrated, the method can include the following steps.

The step 201 is, in a previous stage, to receive respective preamble sub-sequences, and to determine the instances of time at which the respective preamble sub-sequences are detected in a detection window.

The step 202 is, in a current stage, to receive respective preamble sub-sequences, and to determine the instances of time at which the respective preamble sub-sequences are detected in the detection window.

The step 203 is to determine preamble sub-sequences belonging to a same preamble sequence according to the instances of time at which the respective preamble sub-sequences are detected in the current stage, and the instances of time at which the respective preamble sub-sequences are detected in the previous stage.

In some embodiments, the detection window is a ZC sequence detection window.

In some embodiments, the ZC sequence detection window is a ZC sequence detection window of a same root sequence, or a ZC sequence detection window of different root sequences.

In some embodiments, the instances of time at which the respective preamble sub-sequences are detected in the detection window are detected at timing positions.

In some embodiments, determining preamble sub-sequences belonging to the same preamble sequence according to the instances of time at which the respective preamble sub-sequences are detected in the current stage, and the instances of time at which the respective preamble sub-sequences are detected in the previous stage includes: determining an instance of time at which a preamble sub-sequence is detected in the current stage, and an instance of time at which some preamble sub-sequence as preamble sub-sequences belonging to the same preamble sequence in response to that a difference between the instance of time at which the preamble sub-sequence is detected in the current stage, and the instance of time at which some preamble sub-sequence is detected in the previous stage is below a preset difference threshold.

In some embodiments, the preset difference threshold can be determined according to a product precision, or a resolution of a timing position of a user equipment in a cell in a real application, or can be customized.

An example will be described below.

This example will be described based upon estimated relative timing positions of preamble sub-sequences in a 2-stage preamble sequence, but can be extended as appropriate to preamble sub-sequences in an M-stage preamble.

Figure 3A:
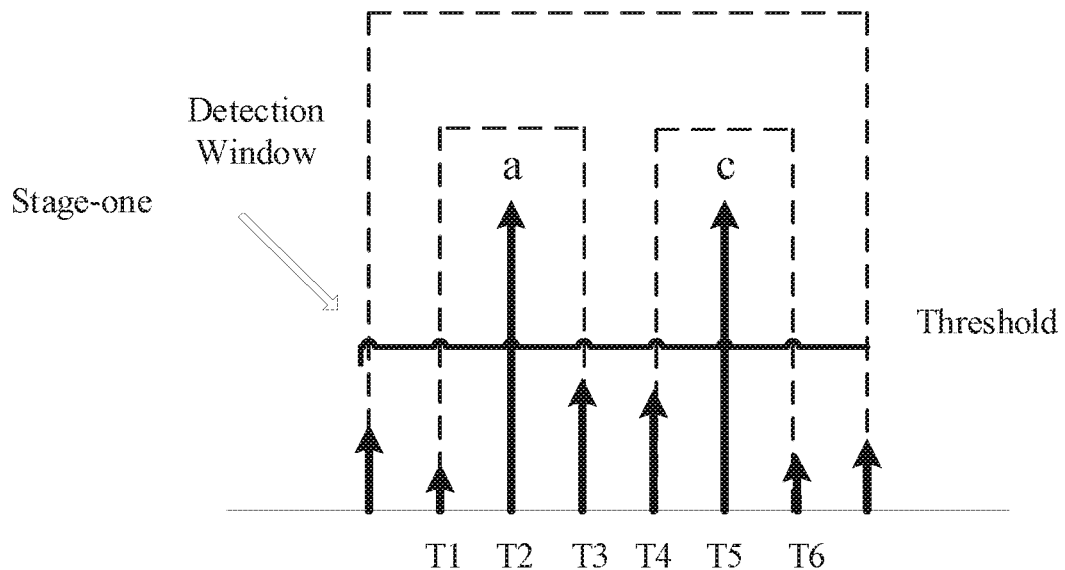
FIG. 3A and FIG. 3B are schematic diagrams of a 2-stage preamble sequence receiver for detecting based upon an estimated relative timing position according to some embodiments of the application.
Figure 3B:
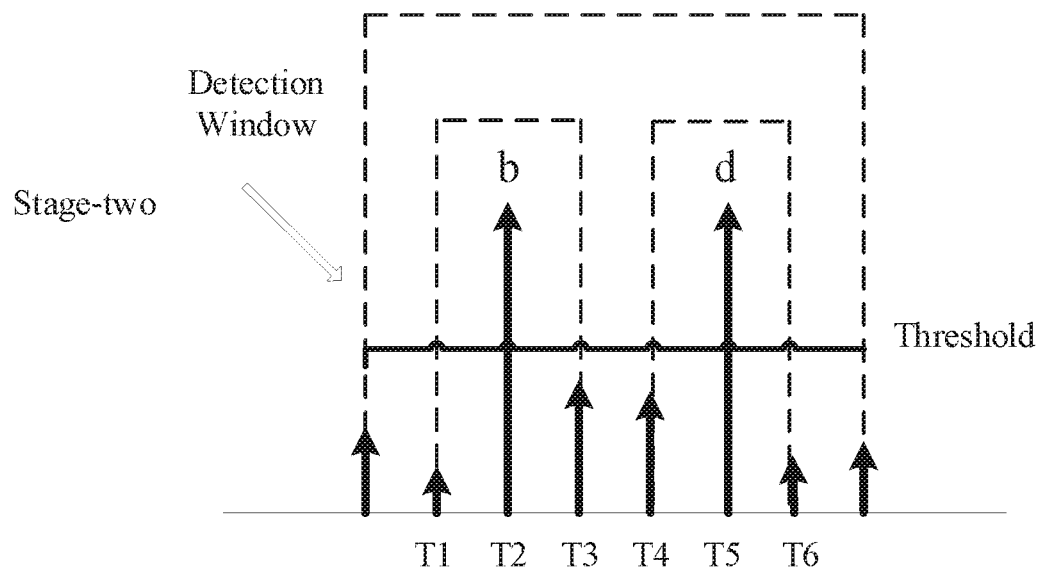

FIG. 3A and FIG. 3B are schematic diagrams of a 2-stage preamble sequence receiver detecting based upon an estimated relative timing position according to some embodiments of the application, and as illustrated, the UE 1 selects a 2-stage preamble sequence (a, b), and the UE 2 selects a 2-stage preamble sequence (c, d). In a ZC sequence detection window of the first stage, the network detects the two sub-sequences a and c respectively at timing positions T2 and T5, and records the timing positions $t(1, 1)=T2$ and $t(1, 2)=T5$.

In a particular implementation, a timing position can be detected by determining the ratio of the maximum of related power in the detection window to noise power as a detection variable, comparing the detection variable with a pre-calculated detection threshold, and if the detection variable at some timing position Tn is above the detection threshold, then determining that a sub-sequence is detected at Tn; otherwise, determining that no sub-sequence is detected at Tn.

In a ZC sequence detection window of the second stage, the network detects the two sub-sequences b and d respectively at the timing positions T2 and T5, and records the timing positions $t(2, 1)=T2$ and $t(2, 2)=T5$.

The network side calculates a relative timing difference between $t(1, 1)$ and $t(2, 1)$ as $delta\_t1=abs(t(1, 1)-t(2, 1))$, and compares the difference with a preset difference threshold JW, and if delta_t1 is below JW, then the network side will determine that the sub-sequences a and b corresponding to these two timing positions belong to the same 2-stage preamble sequence, that is, Pre_UE1=(a, b).

Alike the network side calculates a relative timing difference between $t(1, 2)$ and $t(2, 2)$ as $delta\_t2=abs(t(1, 2) t(2, 2))$, and compares the difference with the preset difference threshold JW, and if delta_t2 is below JW, then the network side will determine that the sub-sequences c and d corresponding to these two timing positions belong to the same 2-stage preamble sequence, that is, Pre_UE1=(c, d).

At this time, the preamble sequence can be detected accurately at the network side.

In some embodiments, the ZC sequence detection windows may or may not be of the same root sequence.

Based upon the same inventive idea, embodiments of the application further provides a device for determining a preamble sub-sequence on a PRACH, and since the device addresses the problem under a similar principle to the method for determining a preamble sub-sequence on a PRACH, reference can be made to the implementation of the method for some embodiments of the device, and a repeated description thereof will be omitted here.

Figure 4:
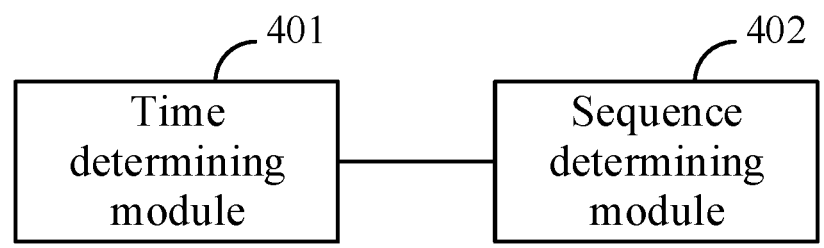
FIG. 4 is a schematic structural diagram of a device for determining a preamble sequence on a PRACH according to some embodiments of the application.

FIG. 4 is a schematic structural diagram of a device for determining a preamble sequence on a PRACH according to an embodiment of the application, and as illustrated, the device can include:

in a previous stage, a time determining module 401 is configured to receive respective preamble sub-sequences, and determine instances of time at which the respective preamble sub-sequences are detected in a detection window; and in a current stage, receive respective preamble sub-sequences, and determine instances of time at which the respective preamble sub-sequences are detected in the detection window; and a sequence determining module 402 is configured to determine preamble sub-sequences belonging to a same preamble sequence according to the instances of time at which the respective preamble sub-sequences are detected in the current stage, and the instances of time at which the respective preamble sub-sequences are detected in the previous stage.

In some embodiments, the time determining module is further configured to determine the instances of time at which the respective preamble sub-sequences are detected in a ZC sequence detection window.

In some embodiments, the ZC sequence detection window is a ZC sequence detection window of a same root sequence, or a ZC sequence detection window of different root sequences.

In some embodiments, the time determining module is further configured to detect the instances of time at which the respective preamble sub-sequences are detected in the detection window at timing positions.

In some embodiments, the sequence determining module is further configured to determine an instance of time at which a preamble sub-sequence is detected in the current stage, and an instance of time at which some preamble sub-sequence as preamble sub-sequences belonging to the same preamble sequence in response to that a difference between the instance of time at which the a preamble sub-sequence is detected in the current stage, and the instance of time at which the some preamble sub-sequence is detected in the previous stage is below a preset difference threshold.

For the sake of a convenient description, the respective components of the devices above have been described respectively as respective functional modules or units. Of course, the functions of the respective modules or units can be performed in the same one or more pieces of software or hardware in some embodiments of the application.

The technical solutions according to the embodiments of the application can be implemented as follows.

Figure 5:
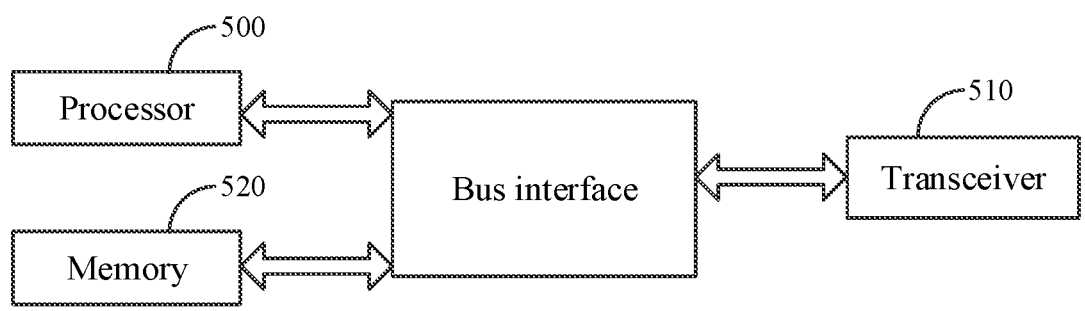
FIG. 5 is a schematic structural diagram of a network-side device according to some embodiments of the application.

FIG. 5 is a schematic structural diagram of a network-side device according to embodiments of the application, and as illustrated, the device includes:

a processor 500 is configured to read and execute program in a memory 520 to:

determine instances of time at which respective preamble sub-sequences are detected in a detection window; and determine preamble sub-sequences belonging to a same preamble sequence according to the instances of time at which the respective preamble sub-sequences are detected in the current stage, and the instances of time at which the respective preamble sub-sequences are detected in the previous stage; and a transceiver 510 is configured to transmit and receive data under the control of the processor 500 is configured to:

receive the respective preamble sub-sequences in the previous stage; and receive the respective preamble sub-sequences in the current stage.

In some embodiments, the detection window is a ZC sequence detection window.

In some embodiments, the ZC sequence detection window is a ZC sequence detection window of a same root sequence, or a ZC sequence detection window of different root sequences.

In some embodiments, the instances of time at which the respective preamble sub-sequences are detected in the detection window are detected at timing positions.

In some embodiments, determining preamble sub-sequences belonging to the same preamble sequence according to the instances of time at which the respective preamble sub-sequences are detected in the current stage, and the instances of time at which the respective preamble sub-sequences are detected in the previous stage includes: determining an instance of time at which a preamble sub-sequence is detected in the current stage, and an instance of time at which some preamble sub-sequence as preamble sub-sequences belonging to the same preamble sequence in response to that a difference between the instance of time at which the preamble sub-sequence is detected in the current stage, and the instance of time at which the some preamble sub-sequence is detected in the previous stage is below a preset difference threshold.

Here in FIG. 5, the bus architecture can include any number of any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices over a transmission medium. The processor 500 is responsible for managing the bus architecture and performing normal processes, and the memory 520 can store data for use by the processor 500 in performing the operations.

The embodiments of the application provide a readable storage medium which is a nonvolatile storage medium including program codes configured to cause a computing device to perform the method above for determining a preamble sequence on a PRACH according to the embodiments of the application, upon being executed on the computing device.

In summary, the technical solutions according to the embodiments of the application can avoid the problem in the prior art that if a plurality of UEs transmits over the same time-frequency resource, then an M-stage preamble sequence on an NR PRACH may not be detected accurately. When a relative timing difference between preamble sub-sequences of the UEs received by the network is more than an estimated relative timing difference between preamble sub-sequences of some UE, the reliability of the preamble sequence solution can be guaranteed in effect.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

What is claimed is:

1. A method for determining a preamble sequence on a Physical Random Access Channel (PRACH), the method comprising:
   in a previous stage, receiving respective preamble sub-sequences, and determining instances of time at which the respective preamble sub-sequences are detected in a detection window;
   in a current stage, receiving respective preamble sub-sequences, and determining instances of time at which the respective preamble sub-sequences are detected in the detection window; and
   determining preamble sub-sequences belonging to a same preamble sequence according to the instances of time at which the respective preamble sub-sequences are detected in the current stage, and the instances of time at which the respective preamble sub-sequences are detected in the previous stage.

2. The method according to claim 1, wherein the detection window is a Zadoff-Chu (ZC) sequence detection window.

3. The method according to claim 2, wherein the ZC sequence detection window is a ZC sequence detection window of a same root sequence, or a ZC sequence detection window of different root sequences.

4. The method according to claim 1, wherein the instances of time at which the respective preamble sub-sequences are detected in the detection window are detected at timing positions.

5. The method according to claim 1, wherein determining preamble sub-sequences belonging to the same preamble sequence according to the instances of time at which the respective preamble sub-sequences are detected in the current stage, and the instances of time at which the respective preamble sub-sequences are detected in the previous stage comprises:
   determining an instance of time at which a preamble sub-sequence is detected in the current stage, and an instance of time at which some preamble sub-sequence as preamble sub-sequences belonging to the same preamble sequence in response to that a difference between the instance of time at which the preamble sub-sequence is detected in the current stage, and the instance of time at which the some preamble sub-sequence is detected in the previous stage is below a preset difference threshold.

6. A device for determining a preamble sequence on a Physical Random Access Channel (PRACH), the device comprising:
   a processor configured to read and execute program in a memory to:
   determine instances of time at which respective preamble sub-sequences are detected in a detection window in a previous stage;
   determine instances of time at which the respective preamble sub-sequences are detected in the detection window in a current stage; and
   determine preamble sub-sequences belonging to a same preamble sequence according to the instances of time at which the respective preamble sub-sequences are detected in the current stage, and the instances of time at which the respective preamble sub-sequences are detected in the previous stage; and
   a transceiver configured to transmit and receive data under the control of the processor is configured to:
   receive the respective preamble sub-sequences in the previous stage; and
   receive the respective preamble sub-sequences in the current stage.

7. The device according to claim 6, wherein the processor is further configured to determine the instances of time at which the respective preamble sub-sequences are detected in a ZC sequence detection window.

8. The device according to claim 7, wherein the ZC sequence detection window is a ZC sequence detection window of a same root sequence, or a ZC sequence detection window of different root sequences.

9. The device according to claim 6, wherein the processor is further configured to detect the instances of time at which the respective preamble sub-sequences in the detection window at timing positions.

10. The device according to claim 6, wherein the processor is further configured to determine an instance of time at which a preamble sub-sequence is detected in the current stage, and an instance of time at which some preamble sub-sequence as preamble sub-sequences belonging to the same preamble sequence in response to that a difference between the instance of time at which the preamble sub-sequence is detected in the current stage, and the instance of time at which the some preamble sub-sequence detected in the previous stage is below a preset difference threshold.

11. A non-transitory readable storage medium, comprising program codes configured to cause a computing device to:
   in a previous stage, receive respective preamble sub-sequences, and determine instances of time at which the respective preamble sub-sequences are detected in a detection window;
   in a current stage, receive respective preamble sub-sequences, and determine instances of time at which the respective preamble sub-sequences are detected in the detection window; and
   determine preamble sub-sequences belonging to a same preamble sequence according to the instances of time at which the respective preamble sub-sequences are detected in the current stage, and the instances of time at which the respective preamble sub-sequences are detected in the previous stage.

12. The non-transitory readable storage medium according to claim 11, wherein the detection window is a Zadoff-Chu (ZC) sequence detection window.

13. The non-transitory readable storage medium according to claim 12, wherein the ZC sequence detection window is a ZC sequence detection window of a same root sequence, or a ZC sequence detection window of different root sequences.

14. The non-transitory readable storage medium according to claim 11, wherein the instances of time at which the respective preamble sub-sequences are detected in the detection window are detected at timing positions.

15. The non-transitory readable storage medium according to claim 11, wherein the program codes are further configured to cause a computing device to:
   determine an instance of time at which a preamble sub-sequence is detected in the current stage, and an instance of time at which some preamble sub-sequence as preamble sub-sequences belonging to the same preamble sequence in response to that a difference between the instance of time at which the preamble sub-sequence is detected in the current stage, and the instance of time at which the some preamble sub-sequence is detected in the previous stage is below a preset difference threshold.

\* \* \* \* \*